United States Patent [19]

Govindaraju et al.

[11] Patent Number: 5,515,455
[45] Date of Patent: May 7, 1996

[54] SYSTEM FOR RECOGNIZING HANDWRITTEN WORDS OF CURSIVE SCRIPT

[75] Inventors: Venugopal Govindaraju, Tonawanda; Dacheng Wang, Buffalo; Sargur Srihari, Williamsville, all of N.Y.

[73] Assignee: The Research Foundation of State University of New York at Buffalo, Buffalo, N.Y.

[21] Appl. No.: 236,252

[22] Filed: May 2, 1994

Related U.S. Application Data

[63] Continuation of Ser. No. 939,171, Sep. 2, 1992.
[51] Int. Cl.⁶ .................................................. G06K 9/00
[52] U.S. Cl. .................. 382/186; 382/177; 382/201; 382/259; 382/203; 382/101
[58] Field of Search ............................. 382/3, 9, 13, 16, 382/19, 25, 26, 28, 55

[56] References Cited

U.S. PATENT DOCUMENTS

| | | | |
|---|---|---|---|
| 3,133,266 | 5/1964 | Frishkopf | 382/13 |
| 3,303,468 | 3/1964 | Liebson et al. | 340/146.3 |
| 4,491,960 | 1/1985 | Brown | 382/26 |
| 4,573,196 | 2/1986 | Crane et al. | 382/13 |
| 4,611,346 | 9/1986 | Bednar et al. | 382/9 |
| 4,628,532 | 12/1986 | Stone et al. | 382/21 |
| 4,903,312 | 2/1990 | Sato | 382/21 |
| 5,029,223 | 7/1991 | Fujisaki | 382/13 |
| 5,058,182 | 10/1991 | Kuan et al. | 382/25 |
| 5,113,453 | 5/1992 | Simon | 382/25 |
| 5,212,739 | 5/1993 | Johnson | 382/25 |
| 5,317,649 | 5/1994 | Nishida | 382/24 |

OTHER PUBLICATIONS

L. Lam and C. Suen, "Structural Classification and Relaxation Matching of Totally Unconstrained Handwritten Zip Code Numbers", *Pattern Recognition*, vol. 21, No. 1, pp. 19–31, 1988.

E. Lecolinet and J. Moreau, "A New System for Automatic Segmentation and Recognition of Unconstrained Handwritten Zip Codes", *The 6th Scandinavian Conference on Image Analysis*, Jun. 19–22, 1989.

M. Shridhar and A. Badreldin, "Recognition of Isolated and Simply Connected Handwritten Numerals", *Pattern Recognition*, vol. 19, No. 1, pp. 1–10, May 1985.

J. Schürmann, "A Multi–Font Word Recognition System for Postal Address Reading", *IEEE Transactions on Computers*, vol. C–27, No. 87, Aug. 1978.

*Primary Examiner*—Leo H. Boudreau
*Assistant Examiner*—David R. Anderson
*Attorney, Agent, or Firm*—Nixon, Hargrave, Devans & Doyle

[57] ABSTRACT

A system for recognizing handwritten words of cursive script by extracting temporal information from static text is described. The temporal information consists of the shape, location and temporal sequence of the segments, or "primitives", constituting the word and is translated from bit maps images of the words into digital information format. By comparing the digital information with formatted digital information for a plurality of known words, as may be stored in computer memory, a list of words having a relatively high probability of matching the static text is generated, and used for word recognition by a process of selecting the most likely match.

31 Claims, 18 Drawing Sheets

CURSIVE SCRIPT

SKELETON

CROSSING STROKE

SKELETON

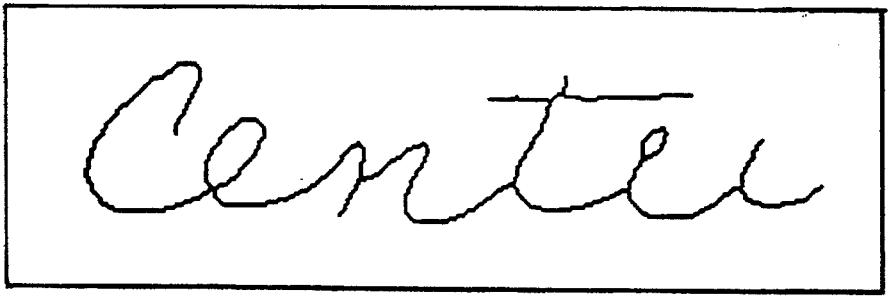
SKELETON     FIG. 5a
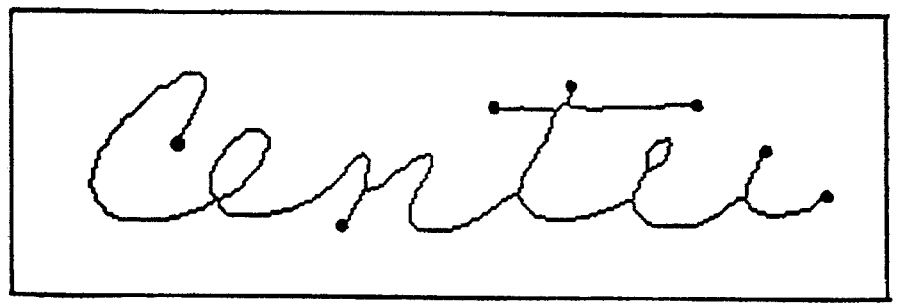
END POINTS     FIG. 5b
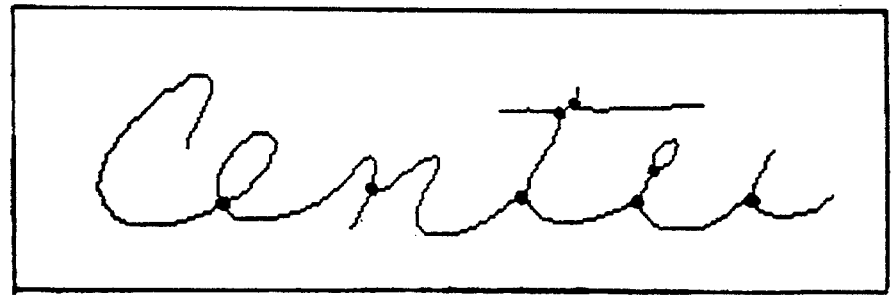
INTERSECTION POINTS     FIG. 5c
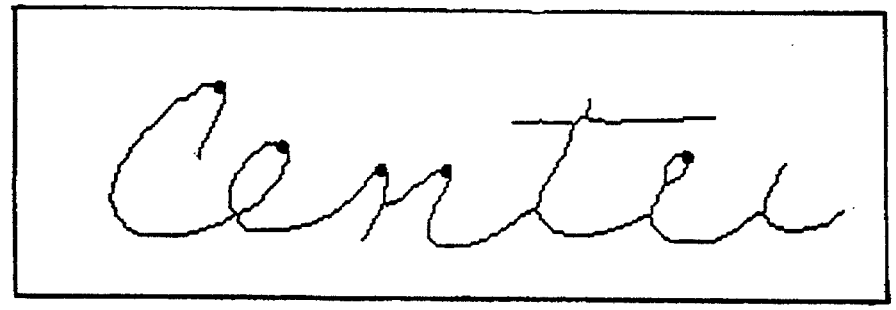
CORNER POINTS     FIG. 5d

FIG.6a
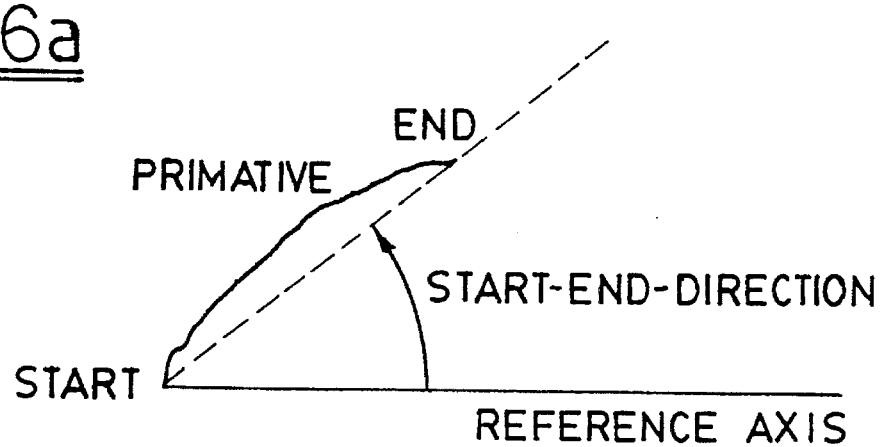
FIG.6b
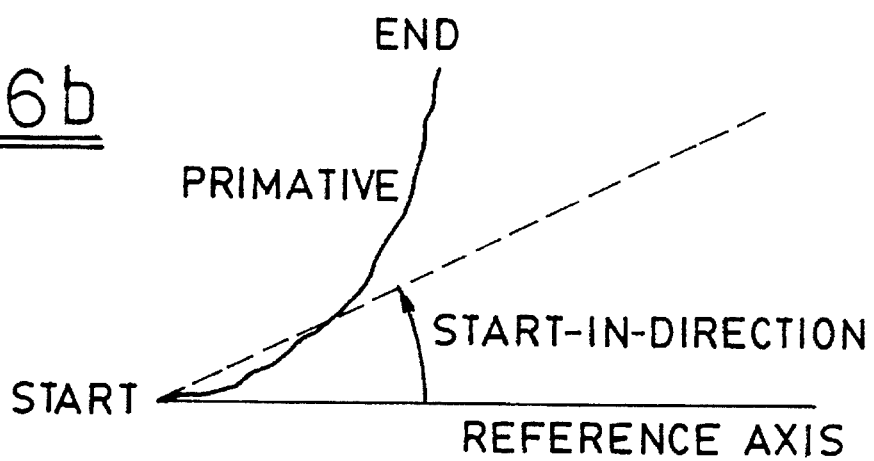
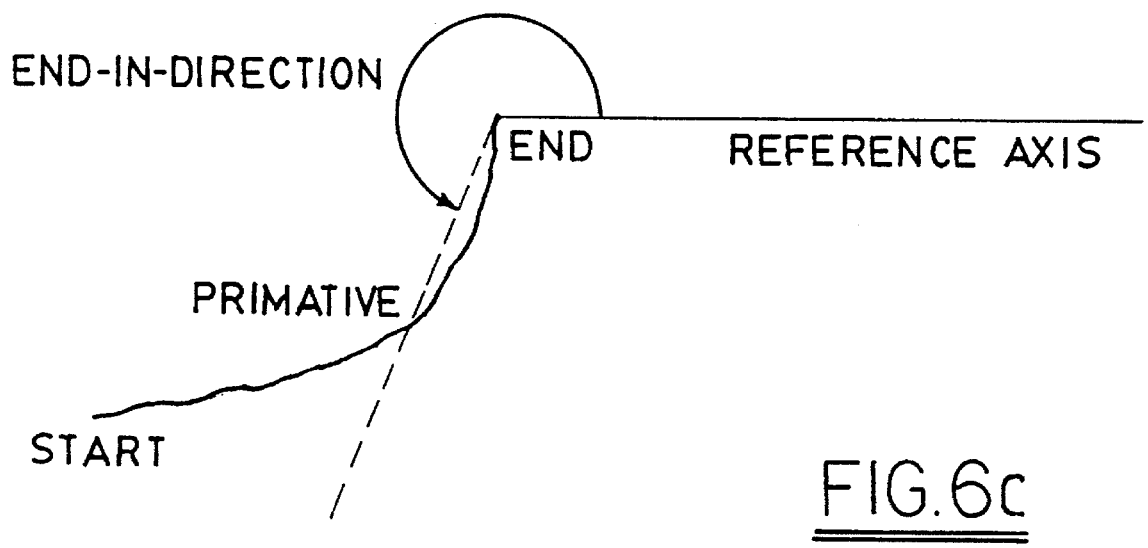
FIG.6c

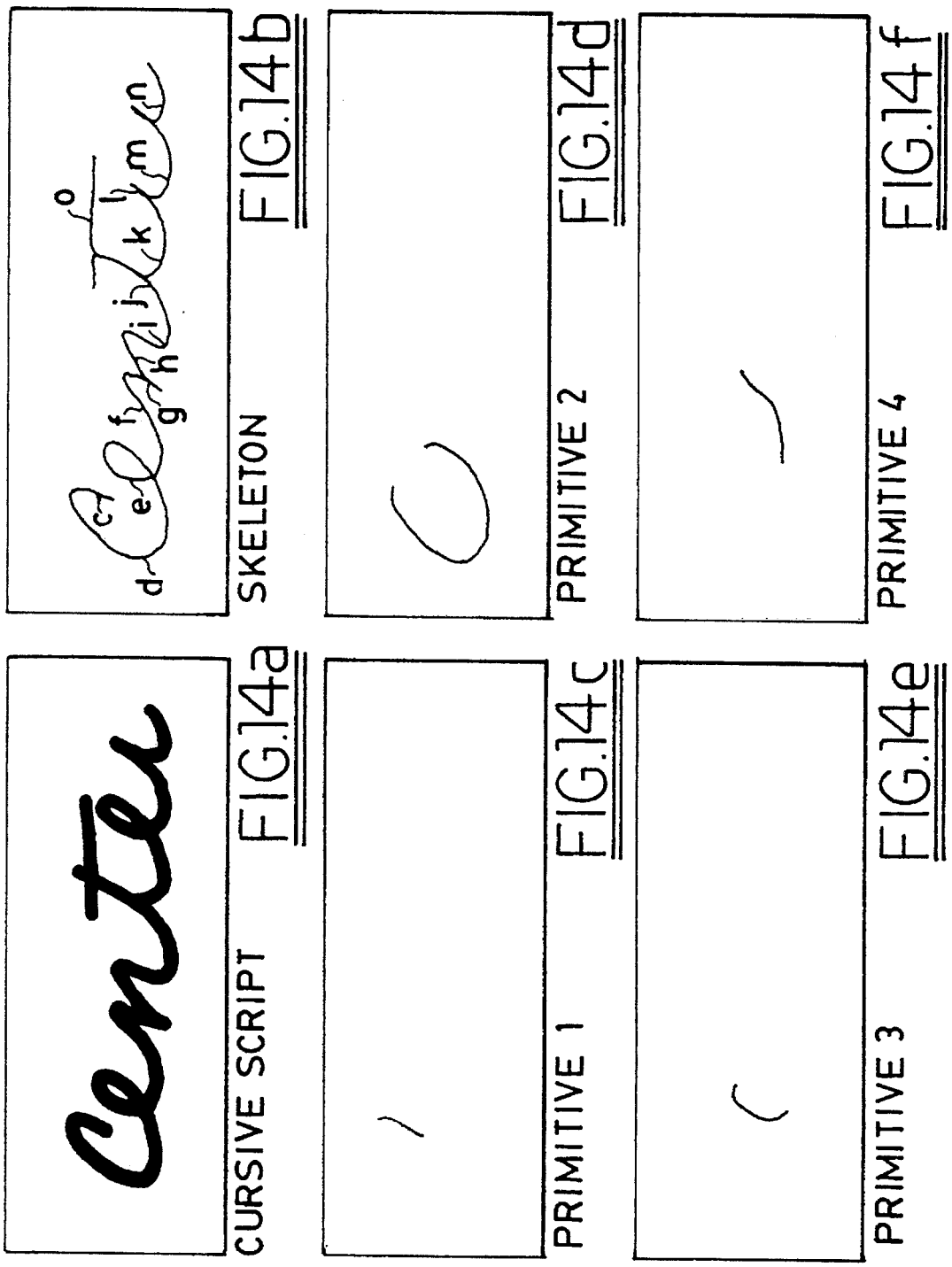

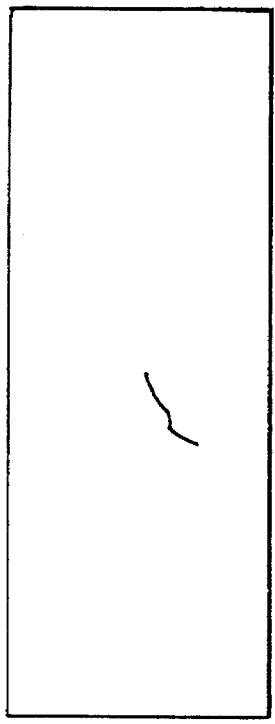
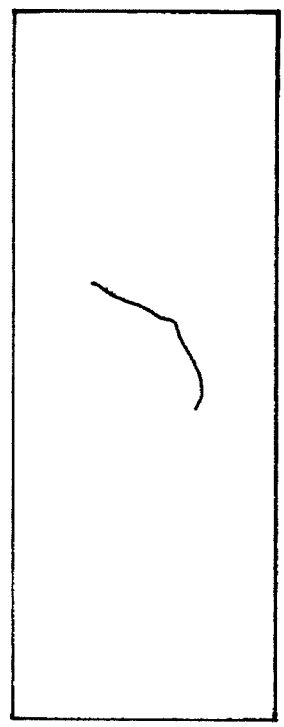
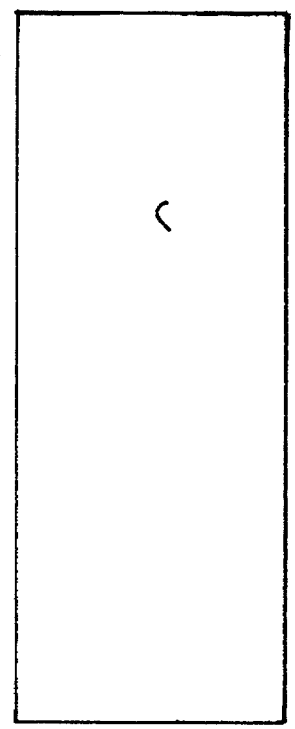
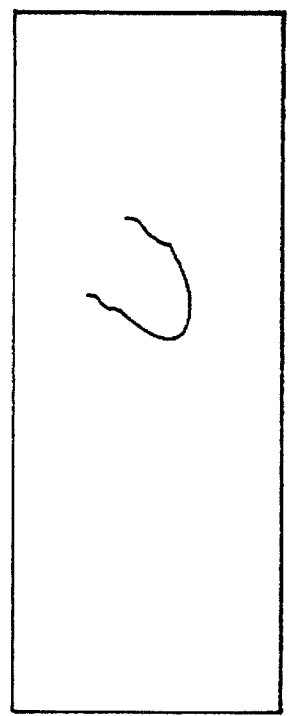

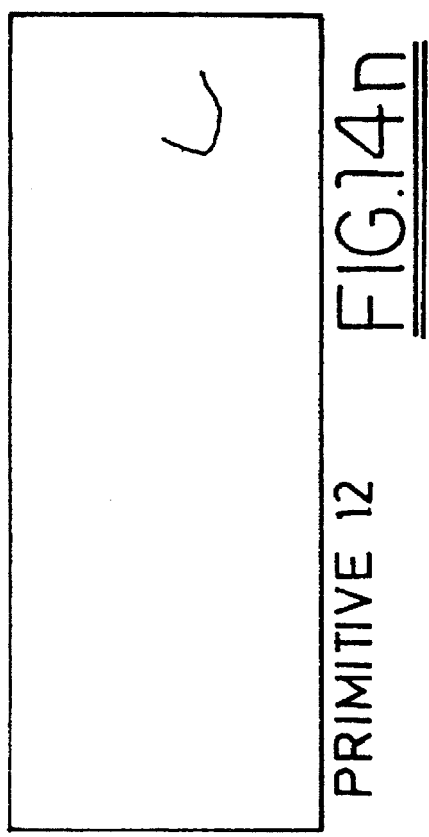
FIG.14n PRIMITIVE 12
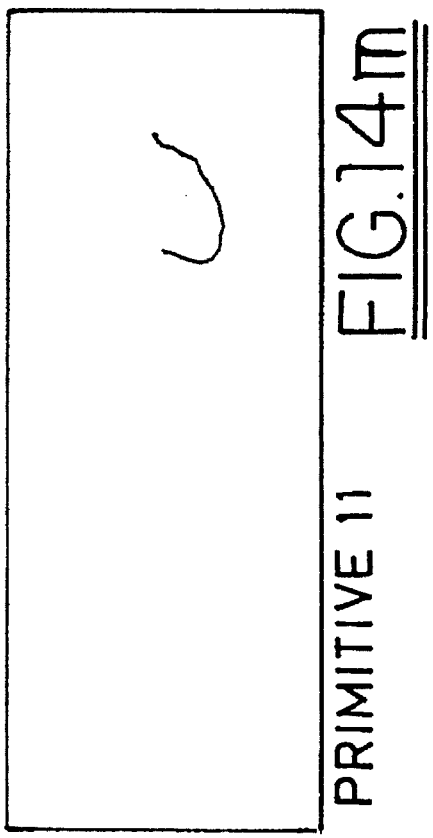
FIG.14m PRIMITIVE 11
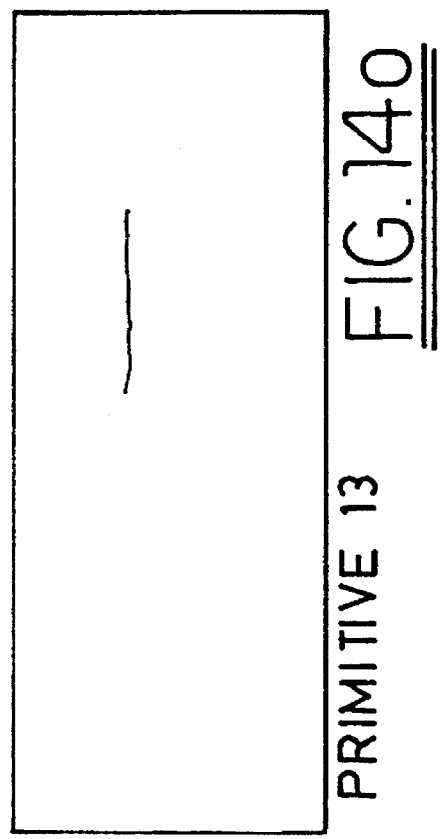
FIG.14o PRIMITIVE 13

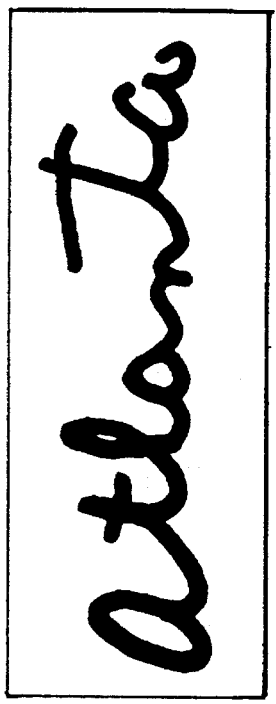
FIG.15a CURSIVE SCRIPT
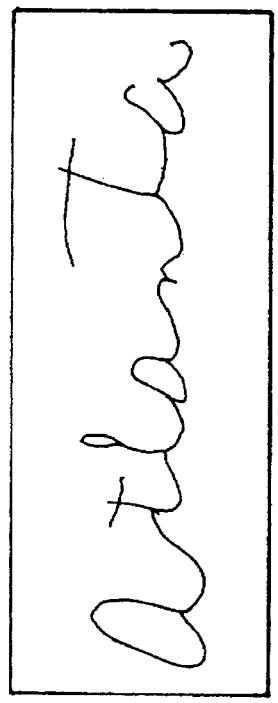
FIG.15b SKELETON
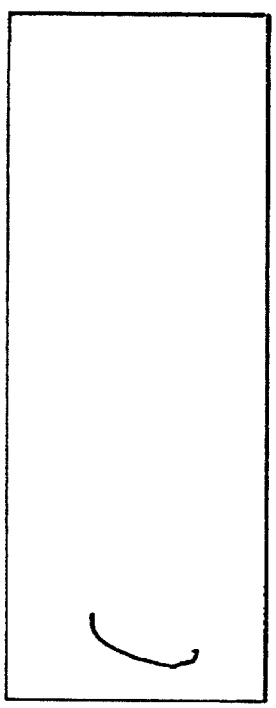
FIG.15c PRIMITIVE 1
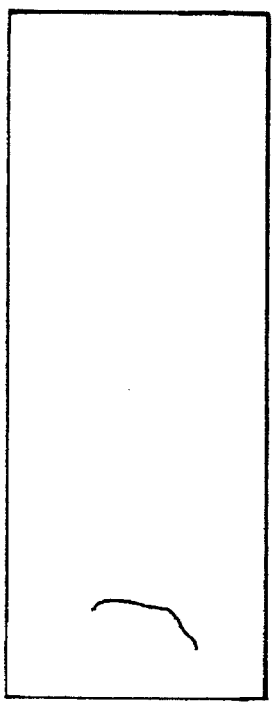
FIG.15d PRIMITIVE 2
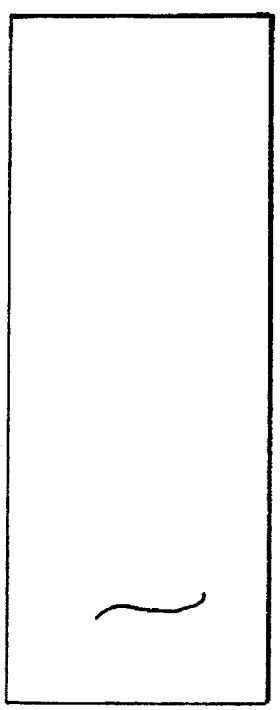
FIG.15e PRIMITIVE 3
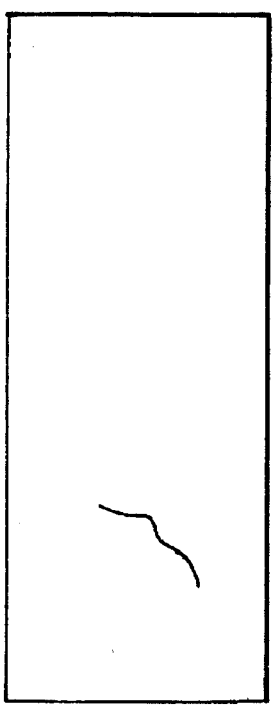
FIG.15f PRIMITIVE 4

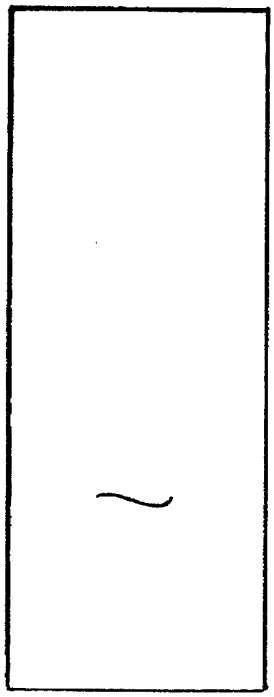
PRIMITIVE 5 — FIG.15g
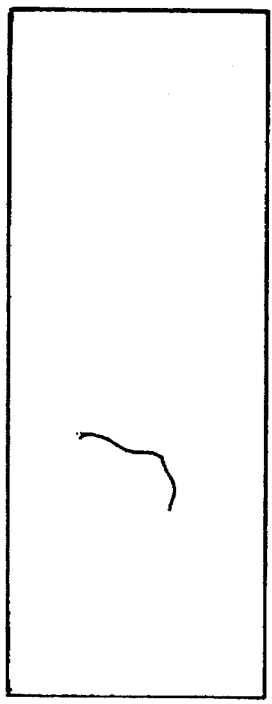
PRIMITIVE 6 — FIG.15h
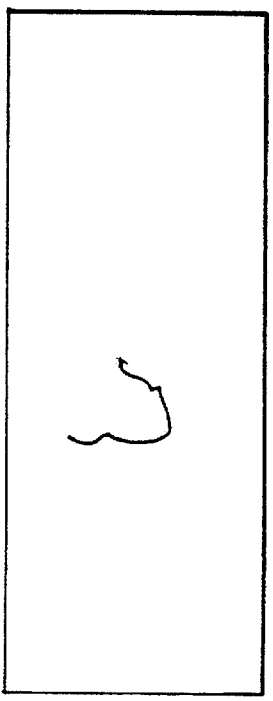
PRIMITIVE 7 — FIG.15i
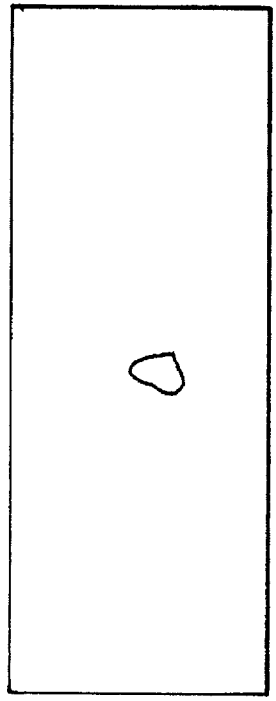
PRIMITIVE 8 — FIG.15j
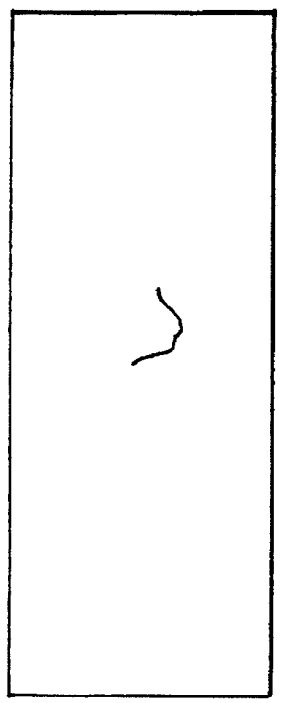
PRIMITIVE 9 — FIG.15k
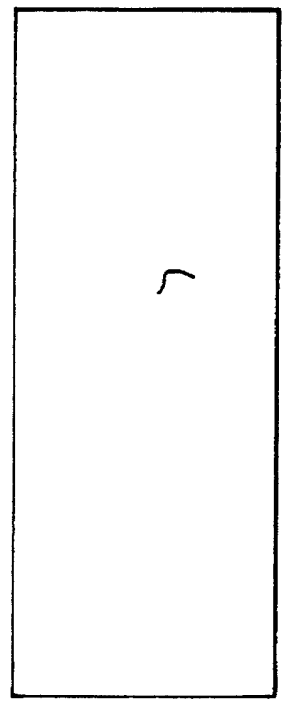
PRIMITIVE 10 — FIG.15l

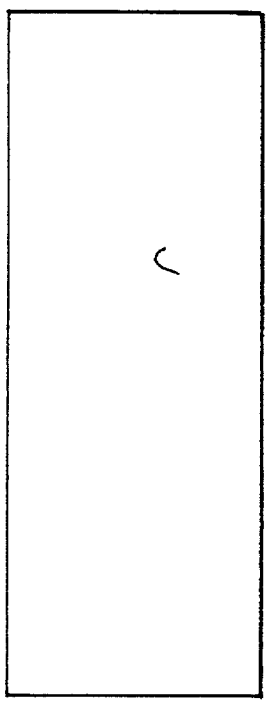
PRIMITIVE 11 — FIG.15m
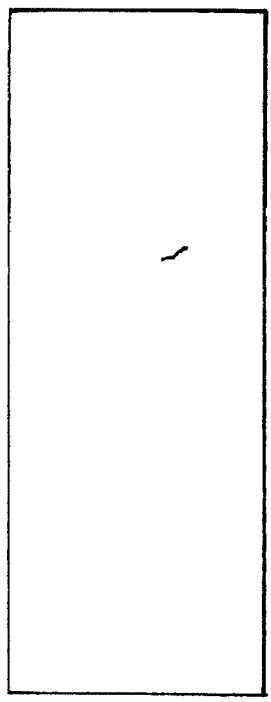
PRIMITIVE 12 — FIG.15n
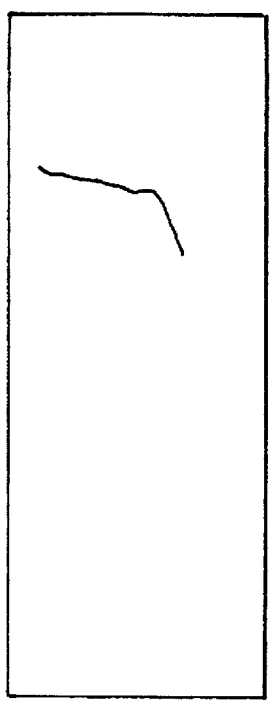
PRIMITIVE 13 — FIG.15o
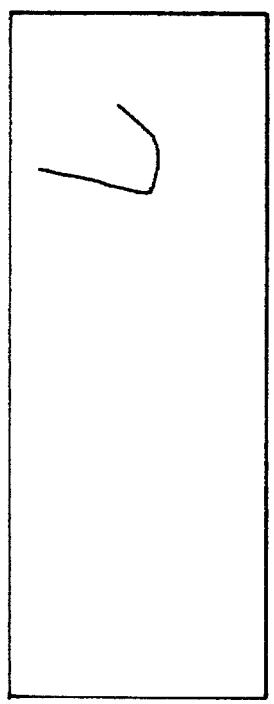
PRIMITIVE 14 — FIG.15p
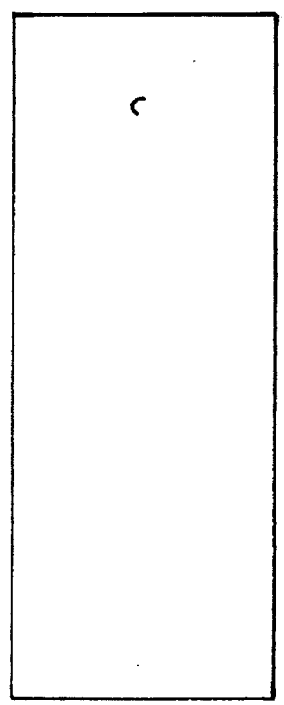
PRIMITIVE 15 — FIG.15q
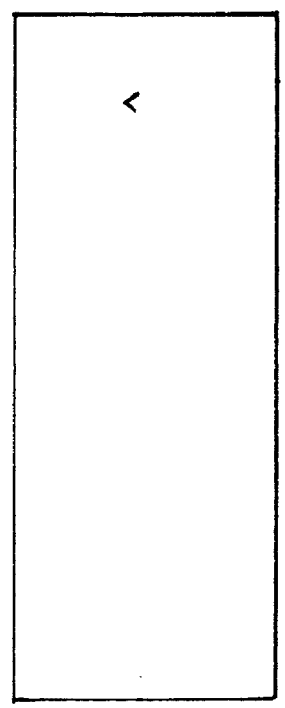
PRIMITIVE 16 — FIG.15r

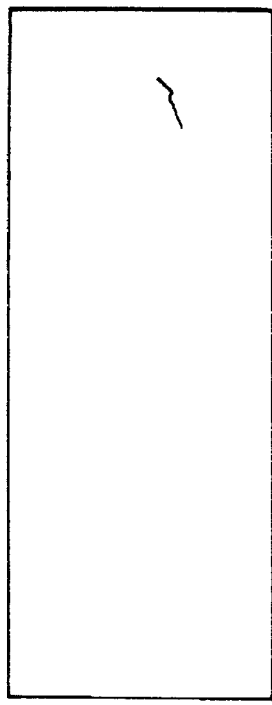
FIG.15t PRIMITIVE 18
FIG.15v PRIMITIVE 20
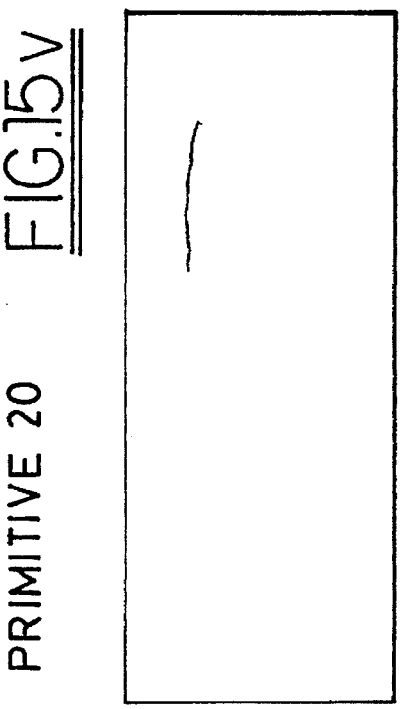
FIG.15x PRIMITIVE 22
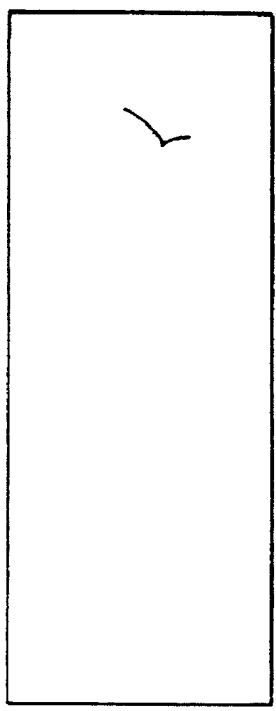
FIG.15s PRIMITIVE 17
FIG.15u PRIMITIVE 19
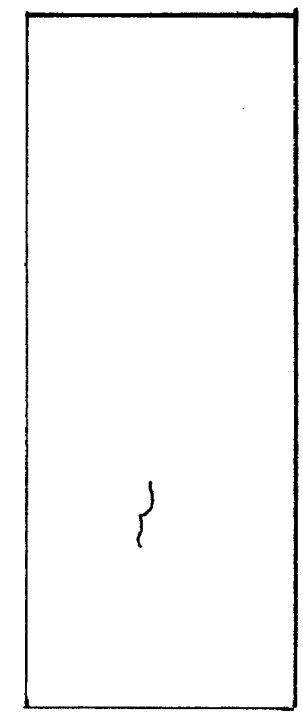
FIG.15w PRIMITIVE 21

CURSIVE SCRIPT

SKELETON

PRIMITIVE 1

PRIMITIVE 2

PRIMITIVE 3

PRIMITIVE 4

PRIMITIVE 5

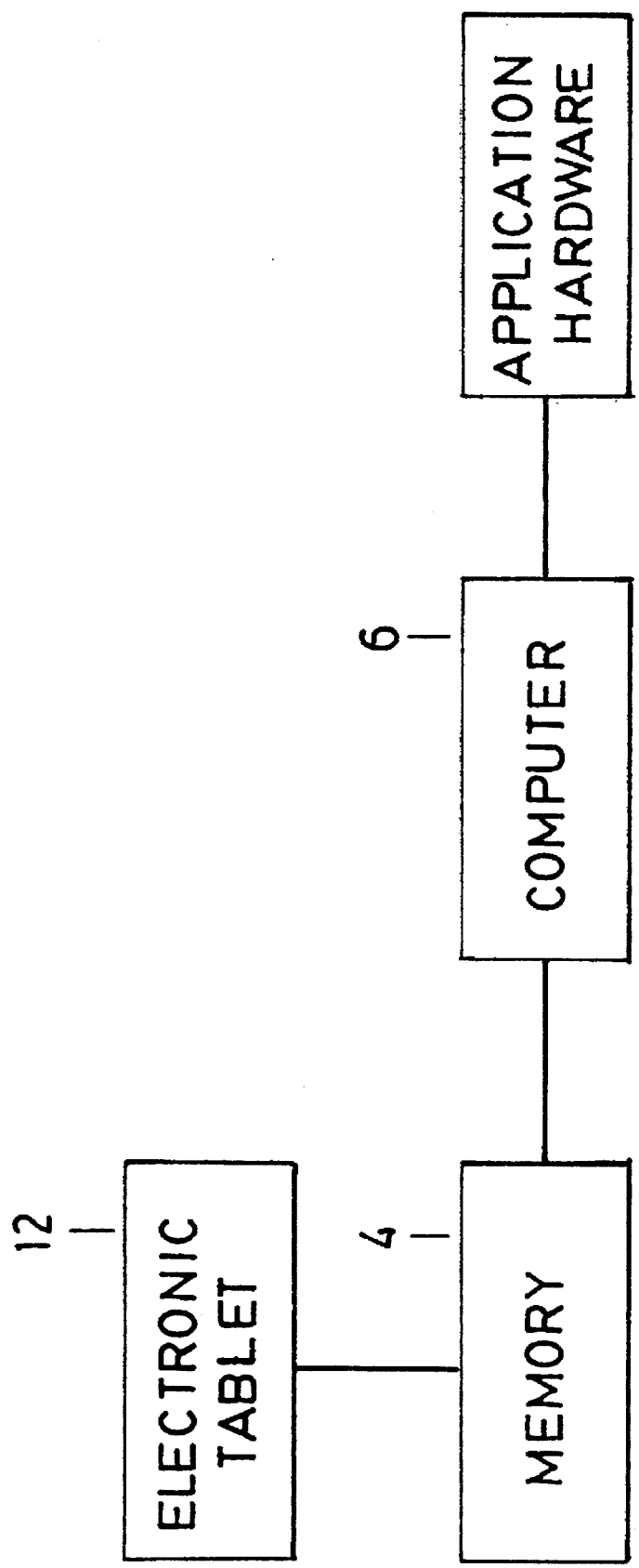

SYSTEM FOR RECOGNIZING HANDWRITTEN WORDS OF CURSIVE SCRIPT

The U.S. Postal Service has rights in this invention pursuant to Contract No. 104230-92-H-3768.

This application is a continuation of application Ser. No. 07/939,171, filed Sep. 2, 1992.

In accordance with 37 CFR § 1.96, a microfiche appendix is to be considered a portion of the entire "written description" of this invention in conformance with 35 U.S.C. § 112. The appendix includes 2 microfiche having 163 frames.

BACKGROUND OF THE INVENTION

This invention relates generally to word recognition technology, and in particular, to a system (method and apparatus) for recognizing handwritten words of cursive script.

Traditional methods of static word recognition require that the subject word be dissected into discrete characters before recognition can be accomplished. Next, the individual characters are recognized, or "classified", using character recognition techniques. Finally, the set of recognized characters is compared with the character patterns of words stored in memory. These techniques are limited in their ability to handle cursive script because of the difficulty of dissecting words with connected characters into individual characters.

Some cursive script recognition systems have suggested use of "on-line" recognition devices. Such devices typically comprise an electronic pad on which a particular word is written. These devices are able to recognize words written in cursive script by analyzing discrete segments of the word as each segment is written. The recognition hardware or software associated with the pad is able to extract from words, in real time, the shapes and sequence of segments of words. These devices are ineffective for reading static images, however, since they rely in part on temporal information, i.e., sequence, in order to make an accurate match. Further, these devices are also susceptible to error, especially when the word is written quickly on the pad.

SUMMARY OF THE INVENTION

The present invention solves the problems associated with prior art static and on-line word recognition methods by providing a method for recognizing handwritten words of cursive script. First, a subject word is optically read. A bit map of the word is then formed. The bit-mapped image of the word is then skeletonized. The skeletonized word has a number of feature points, including an original point, a terminal point and a plurality of intermediate points, including end points, intersecting points and corner points. Segmentation into primitives each having a quantifiable shape then is carried out. Each primitive represents a portion of the word between two feature points having predetermined characteristics. The primitives are then ordered in succession, beginning at the left side of the word, to form a sequence representing the order in which each primitive was written. Finally, the word is recognized by comparing the primitives and the sequence with each of a plurality of sets of stored primitives and their associated sequences for known words.

BRIEF DESCRIPTION OF THE DRAWINGS

FIG. 5 depicts a skeletonized image of a candidate word and illustrates feature points within the word;

FIG. 6 displays the shape attributes of a primitive;

FIG. 14(*a*) depicts a candidate word;

FIG. 14(*b*) depicts a skeleton of the candidate word of FIG. 14(*a*);

FIG. 14(*c*) depicts a first primitive of the skeleton candidate word;

FIG. 14(*d*) depicts a second primitive of the skeleton candidate word;

FIG. 14(*e*) depicts a third primitive of the skeleton candidate word;

FIG. 14(*f*) depicts a fourth primitive of the skeleton candidate word;

FIG. 14(*g*) depicts a fifth primitive of the skeleton candidate word;

FIG. 14(*h*) depicts a sixth primitive of the skeleton candidate word;

FIG. 14(*i*) depicts a seventh primitive of the skeleton candidate word;

FIG. 14(*j*) depicts a eighth primitive of the skeleton candidate word;

FIG. 14(*k*) depicts a ninth primitive of the skeleton candidate word;

FIG. 14(*l*) depicts a tenth primitive of the skeleton candidate word;

FIG. 14(*m*) depicts a eleventh primitive of the skeleton candidate word;

FIG. 14(*n*) depicts a twelfth primitive of the skeleton candidate word;

FIG. 14(*o*) depicts a thirteenth primitive of the skeleton candidate word;

FIG. 15(*a*) depicts a candidate word;

FIG. 15(*b*) depicts a skeleton of the candidate word of FIG. 15(*a*);

FIG. 15(*c*) depicts a first primitive of the candidate word;

FIG. 15(*d*) depicts a second primitive of the candidate word;

FIG. 15(*e*) depicts a third primitive of the candidate word;

FIG. 15(*f*) depicts a fourth primitive of the candidate word;

FIG. 15(*g*) depicts a fifth primitive of the candidate word;

FIG. 15(*h*) depicts a sixth primitive of the candidate word;

FIG. 15(*i*) depicts a seventh primitive of the candidate word;

FIG. 15(*j*) depicts a eighth primitive of the candidate word;

FIG. 15(k) depicts a ninth primitive of the candidate word;

FIG. 15(l) depicts a tenth primitive of the candidate word;

FIG. 15(m) depicts a eleventh primitive of the candidate word;

FIG. 15(n) depicts a twelfth primitive of the candidate word;

FIG. 15(o) depicts a thirteenth primitive of the candidate word;

FIG. 15(p) depicts a fourteenth primitive of the candidate word;

FIG. 15(q) depicts a fifteenth primitive of the candidate word;

FIG. 15(r) depicts a sixteenth primitive of the candidate word;

FIG. 15(s) depicts a seventeenth primitive of the candidate word;

FIG. 15(t) depicts a eighteenth primitive of the candidate word;

FIG. 15(u) depicts a nineteenth primitive of the candidate word;

FIG. 15(v) depicts a twentieth primitive of the candidate word;

FIG. 15(w) depicts a twenty-first primitive of the candidate word;

FIG. 15(x) depicts a twenty-second primitive of the candidate word;

FIG. 20 shows a block diagram of a system for recognizing words of cursive script in accordance with the present invention in conjunction with an electronic tablet.

DETAILED DESCRIPTION

I. Preprocessing

Figure 19:
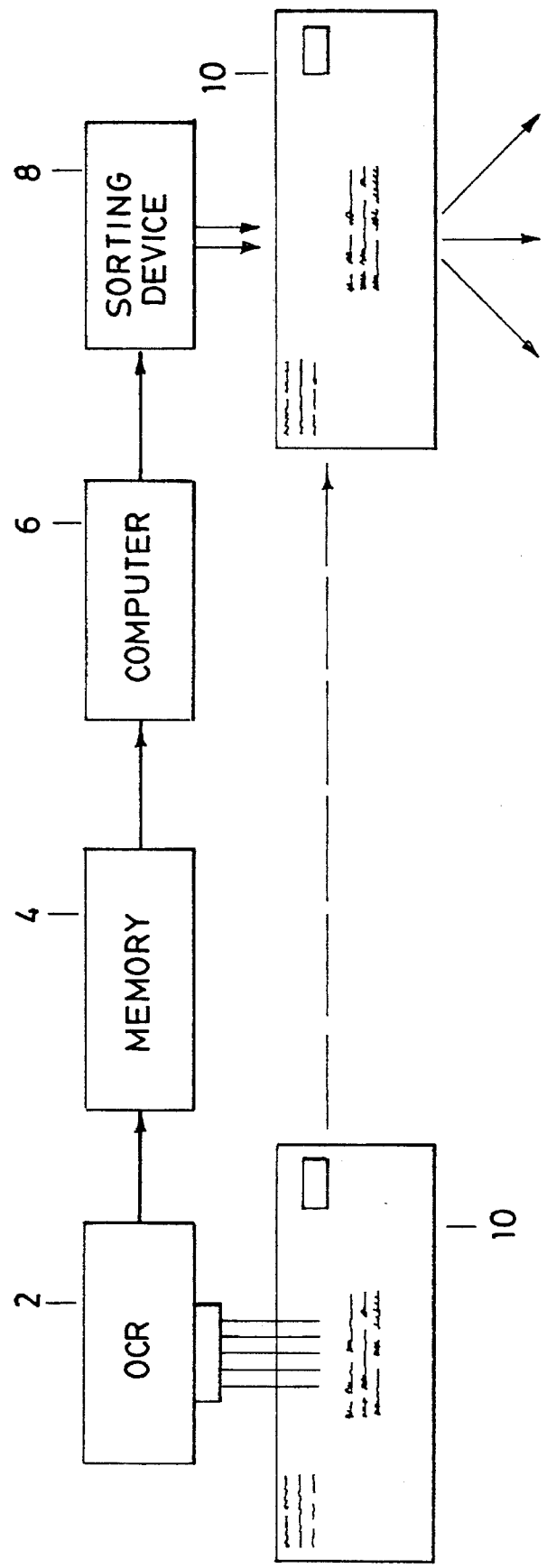
FIG. 19 shows a block diagram of a system for recognizing words of cursive script in accordance with the present invention incorporated in a mail sorting system.

The procedure for recognizing a candidate word of cursive script carried out by the apparatus of the present invention begins with a preprocessing stage. The preprocessing stage includes scanning a word, skeletonization by thresholding and thinning an image of that word, and identification of special structural patterns formed in the thinned images. Each of these steps is now described in detail below. The process can be implemented as part of a system for reading and sorting mail. Such a system is shown in FIG. 19.

Figure 17:
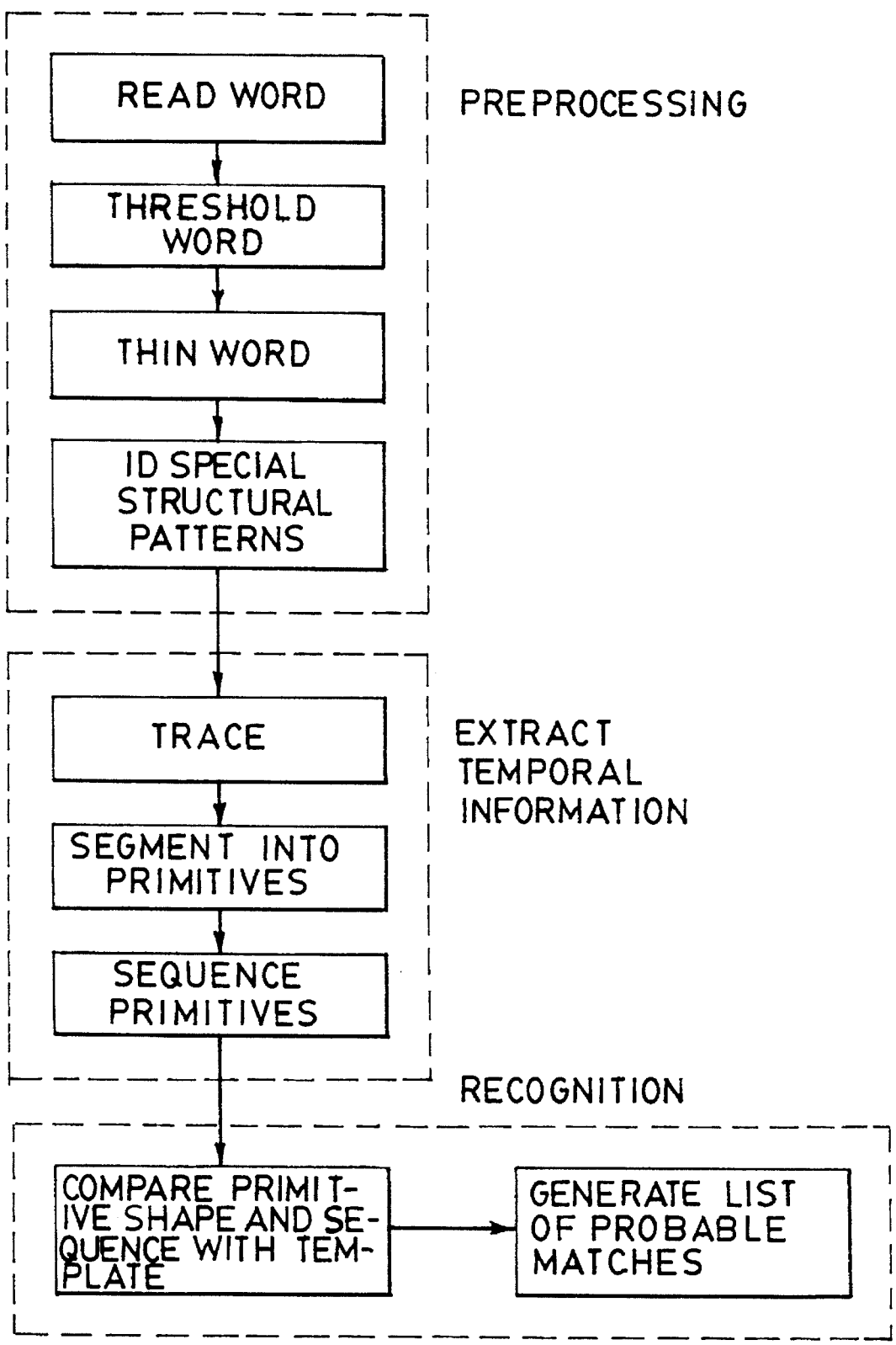
FIG. 17 is a flowchart of the steps of the present method.

First, referring to FIG. 17, a candidate word of handwritten, cursive script is scanned using an Optical Character Reader ("OCR") device. This scanning procedure produces a binary coded image of the word. Each pixel of the scanned image is represented by an 8-bit data word indicative of the pixel's gray scale level. The bit-mapped image is stored as a matrix in a computer memory. The matrix is stored using the widely known "HIPS" algorithm.

Figure 1A:
FIG. 1 shows a candidate word before and after a skeletonizing procedure.
Figure 1B:
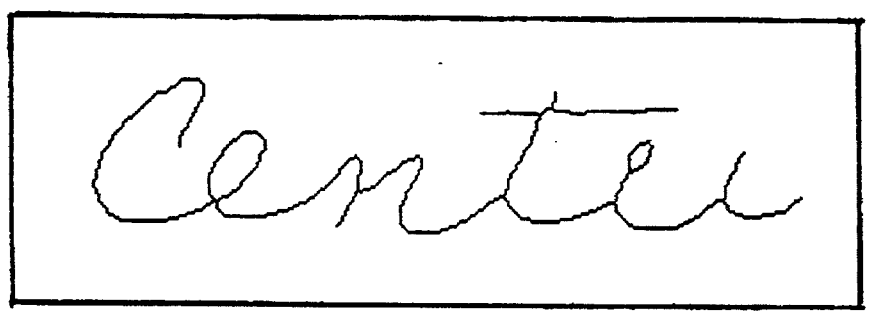

Next, the bit-mapped image is skeletonized. Skeletonization consists of the steps of thresholding and thinning. Thresholding refers to a procedure which binarizes the word image into an image with binary pixel values of one or zero. Thresholding is conducted by designating all pixels having a gray-scale level above a certain value as "1" (white) and all others as "0" (black). The thresholded image is thinned according to a known procedure. A preferred skeletonization process is described in T. Pavlidis, "Algorithms for Graphics and Image Processing," p. 200, Computer Science Press, 1982 which is incorporated herein by reference. A thinned candidate word is shown in FIG. 1(b). The thinning process produces a word image having a contour roughly of one pixel in width. Thus, a "skeleton" representation of the bit-mapped word image is created. The skeleton of the word greatly simplifies the computation necessary in subsequent steps while retaining all structural information necessary for recognition.

As a final preprocessing step, special structural patterns are identified in the thinned image. The special structural patterns occur in two situations: When a wide-tipped pen blurs intersection points; and when a character contains a loop.

Figure 2A:
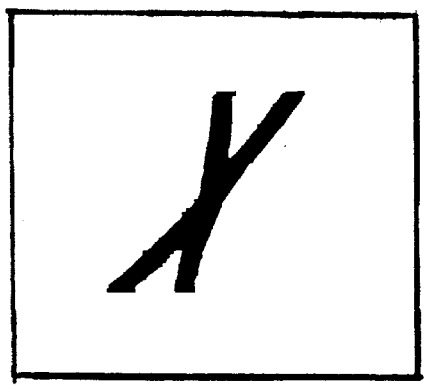
FIG. 2 shows an image of a character having intersecting branches before and after skeletonization.
Figure 2B:
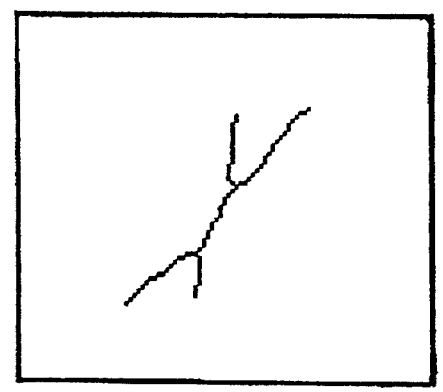
Figure 3:
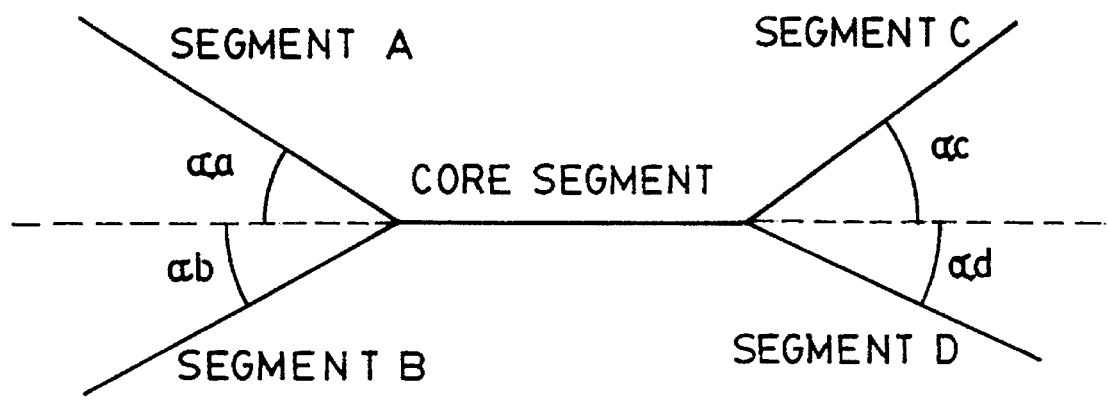
FIG. 3 is a diagram depicting cross-stroke structure (CSS) for characters with intersecting branches.

The first type of special structural pattern identified is "cross-stroke structure" (CSS). CSS occurs when a portion of a candidate word contains an overlapping region bounded by a pair of forked segments, as in FIG. 2(b). This typically occurs in characters having intersection points blurred during thinning, as shown in FIG. 2. CSS is a pattern containing a core segment and two segments at each end, each of the end segments forming an angle with the core segment of ~90°. CSS is shown schematically in FIG. 3. Each of angles aa-ad is ~ 90°. CSS occurs, for instance, when the letter "x" is written with a wide-tipped pen. In this situation, there appears to be an overlap rather than intersection. The identification of CSS provides information used in subsequent tracing steps.

Figure 7:
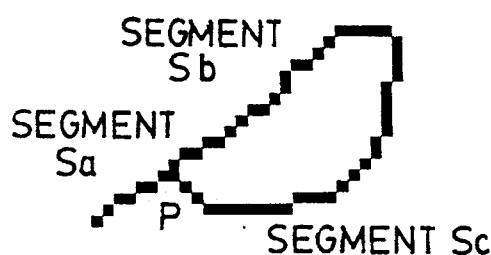
FIG. 7 depicts a thinned, cursive, lowercase "s"
Figure 8:
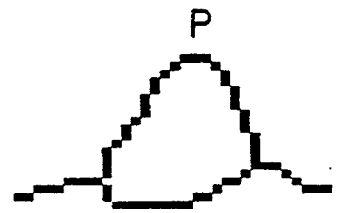
FIG. 8 depicts a thinned, cursive, lowercase "a"
Figure 9:
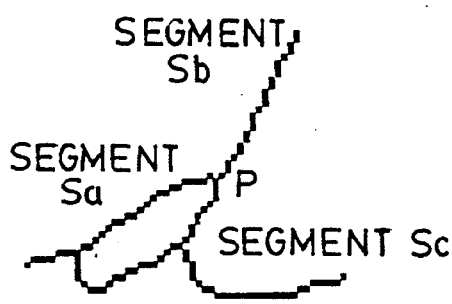
FIG. 9 depicts a thinned, cursive, lowercase "d"
Figure 10:
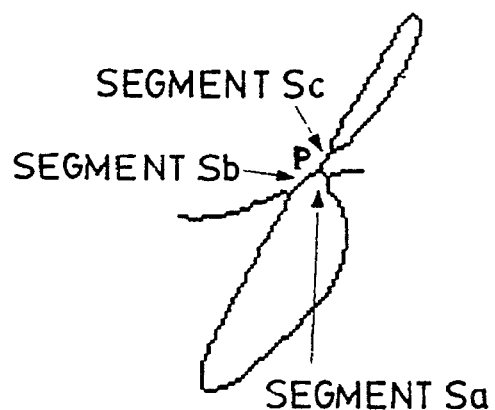
FIG. 10 depicts a thinned, cursive, lowercase "f"

The second type of special structural pattern identified is a loop structure. A loop occurs when a pen stroke crosses itself. Two types of loops appear in cursive script. In the first type, there is a single intersection point in the loop. See, for example, the cursive, lower case "s" in FIG. 7. The second type of loop contains two or more intersection points. See, for example, the letters in FIGS. 8–11.

Figure 4A:
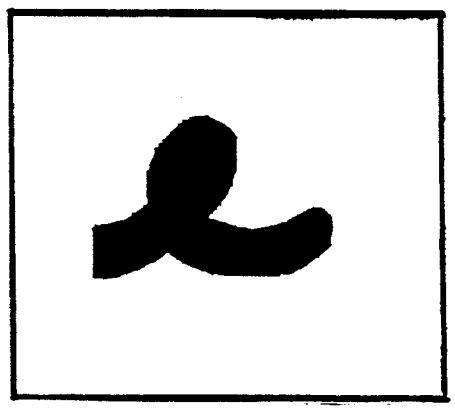
FIG. 4 depicts an image of a character having a closed loop.
Figure 4B:
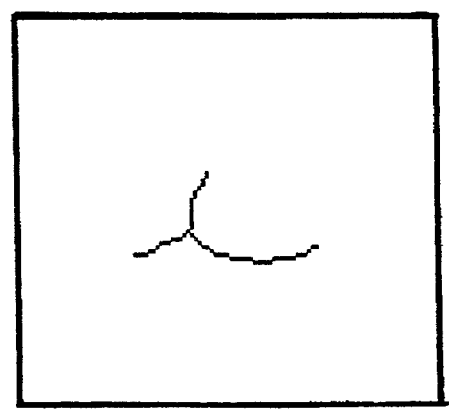

Another type of loop structure results from the use of wide-tipped pens is shown in FIG. 4, namely, closed loops. The thinned image, as a consequence of the wide pen tip, has no loop. See FIG. 4(b). Again, the identification of closed loop structure is useful in later tracing steps.

II. Extraction of Temporal Information

After preprocessing, temporal information in the form of an ordered list of primitives is extracted from the skeleton. This entails three steps: tracing, segmenting and sequencing. The skeletonized image is traced and segmented into a set of primitives. Each of the primitives represents a discrete segment of the word. In tracing the word, each primitive is assigned an ordinal value based upon the order in which it was written, i.e., sequenced. Each of the steps of tracing, segmenting and sequencing is now described in detail.

First, the word is traced. During tracing, the word is segmented into primitives. A primitive is a portion of the word representing a pen stroke beginning and ending with a feature point having predetermined characteristics. A word can contain three different types of feature points: end points (which can be an original or terminal point, which are points at which the writing instrument first and last touches the paper, respectively), corner points and intersection points.

Figure 12:
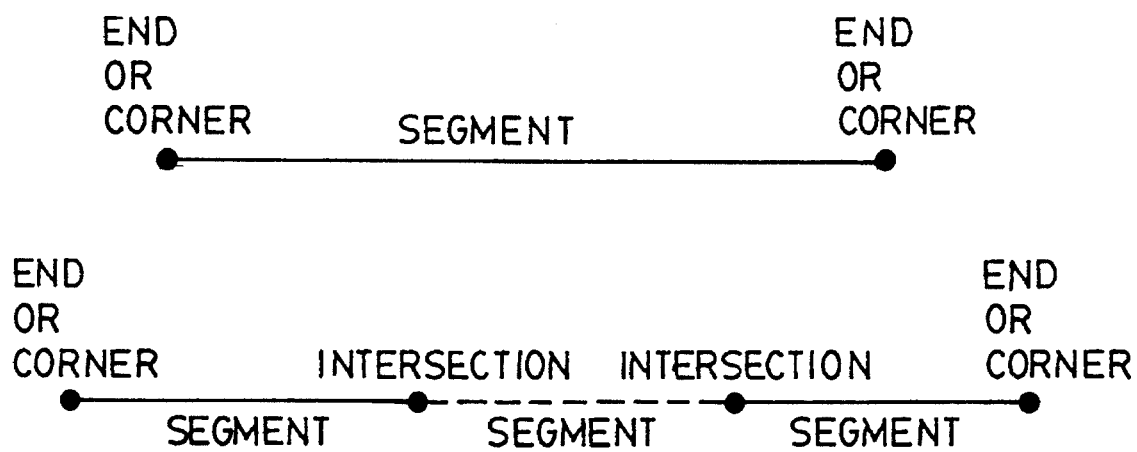
FIG. 12 depicts typical primitive configurations.

Each of the types of feature points is assigned a "degree." End points are defined as being of degree=1, corner points have degree=2, and intersection points have degree=3. A primitive occurs between two feature points having degree ~2 and having no such feature points in between. Each feature point is assigned a coordinate value on the coordinate system shown in FIG. 18. Tracing normally begins from the left-most end point (usually in the left-most or next-to-left-most primitive) and the thinned image (i.e., contiguous pixels assigned a value of zero) is followed until the next feature point of degree ~2 is encountered. See FIG. 12. When such a point is encountered, the shape information of the traced primitive is stored and labelled, and the next primitive is then traced. Each primitive is represented in memory by a chain code. That is, each pixel in a primitive is stored as a record containing a value representing the pixel's location in the x-y plane and a pointer describing the location of adjacent pixels. The next primitive is defined by the terminal feature point of the first primitive and the next encountered feature point of degree ~2.

Figure 13:
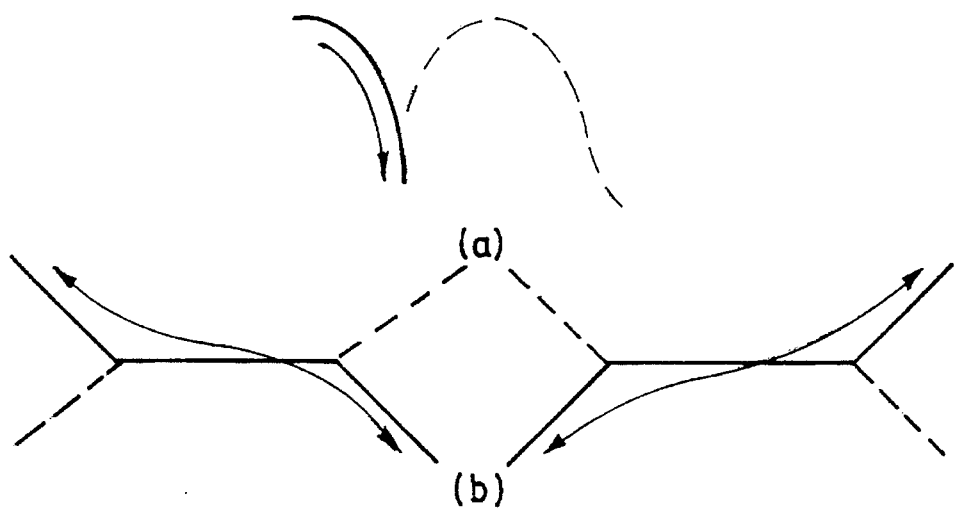
FIG. 13 depicts the tracing route of a character with cross-stroke structure (CSS)
Figure 16A:
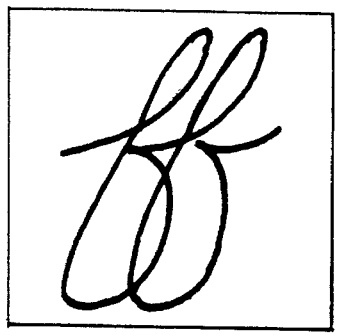
FIG. 16 shows how primitives can be extracted from overlapping letters.
Figure 16B:
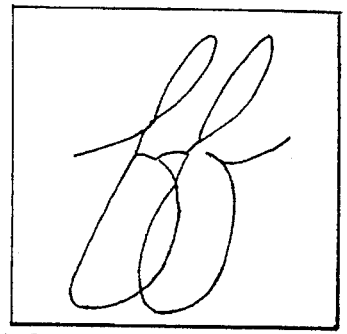
Figure 16C:
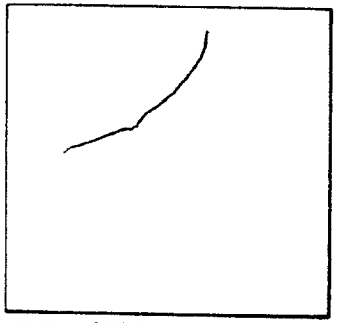
Figure 16D:
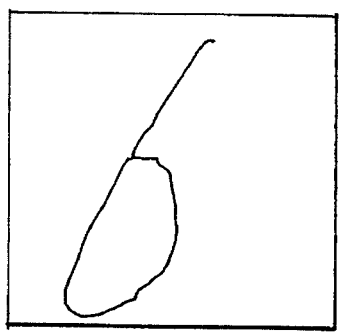
Figure 16E:
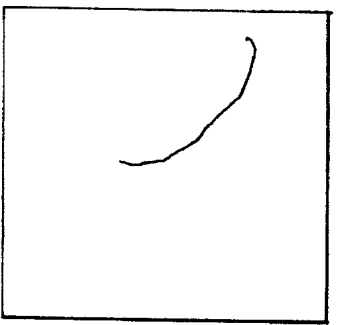
Figure 16F:
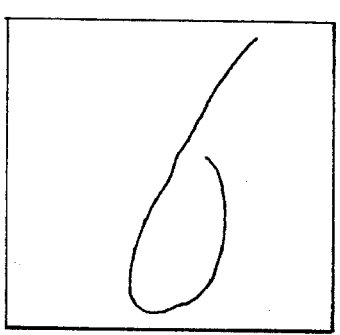
Figure 16G:
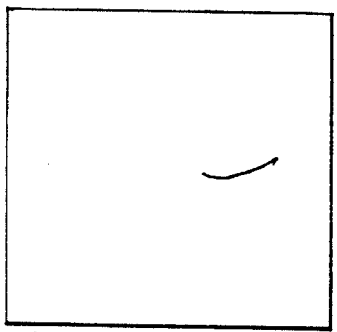

When tracing, intersection points, i.e., feature points of degree=3, initially are ignored and tracing continues until a feature point of degree ~2 is reached. When there is a single intersection point within the primitive which connects three branches, the branch forming the largest angle with the other two is followed. This tracing rule can best be seen in FIG. 13(a). In the event that a second intersection point is encountered within a primitive, such as in a portion of the word having a CSS, the tracing algorithm will trace the diagonal path. This rule is based upon the assumption that human hand movements are smooth and hence are likely to generate smooth trajectories. See FIG. 13(b). Subsequent intersection points within the same primitive will alternately follow the procedure for single and double intersection points.

If the intersection is part of a loop structure of the first or second type, special tracing rules are followed. If of the first type, the loop is decoupled at the intersection point "p", shown in FIG. 7. Segment Sc is detached from point "p" and point "p" serves as a corner point between Sa and Sb.

Figure 11:
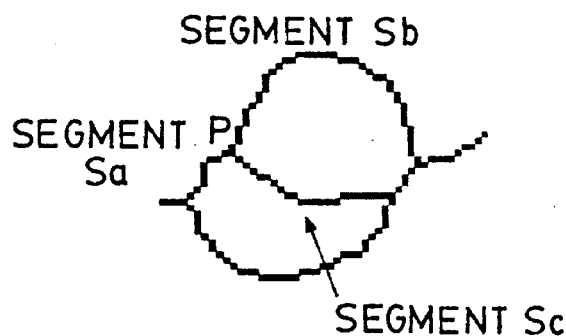
FIG. 11 depicts a thinned cursive, lowercase "o"

Referring to FIGS. 8–11 for the case of a loop structure of the second type, one intersection point in the loop structure is treated as a "break point" point. That is, point p is treated as a corner point and tracing through the loop structure is conducted as if the intersection was a corner point. Which intersection is treated as a break point depends on which of four categories the loop is classified under. The four categories are as follows:

1) "a" category: suitable for letters a, g, q and o (see FIG. 8);
2) "d" category: suitable for letter d (see FIG. 9);
3) "f" category: suitable for letters f, q, b, k and p (see FIG. 10); and
4) "o" category: suitable for letter o (see FIG. 11).

In each of the four cases, the segment labelled Sc is detached from point "p". Point "p" serves as a corner point between segments Sa and Sb.

When, after encountering one or more intersection points in a letter not containing a CSS or loop structure, an end point or corner point is reached, the tracing of that primitive is complete. If the feature point encountered is an end point, the next primitive is traced by retracing the preceding primitive until the initial intersection of the preceding primitive is reached. Tracing then continues along the branch not followed when the preceding primitive was traced. The overlapping region thus becomes a part of two primitives. This second primitive will also include the intersection point(s) of the first primitive.

If the terminal feature point of the first primitive is a corner point, the tracing of the next primitive continues along the thinned image without "back tracking", although part of a subsequent primitive may overlap with the portion of the preceding primitive containing the intersection points.

In the event that the terminal end point of a line in the word is reached before all lines of pixels constituting the subject word have been traced, the method described herein is repeated until the entire word has been traced. The need to repeat the tracing procedure arises, for instance, when a word contains crossed "T's", or dotted "I's".

Each cross or other untraced line is traced and the shape and sequence stored with the set of primitives representing the previously traced portion of the word. This tracing procedure is repeated until the entire candidate word has been traced.

Figure 18:
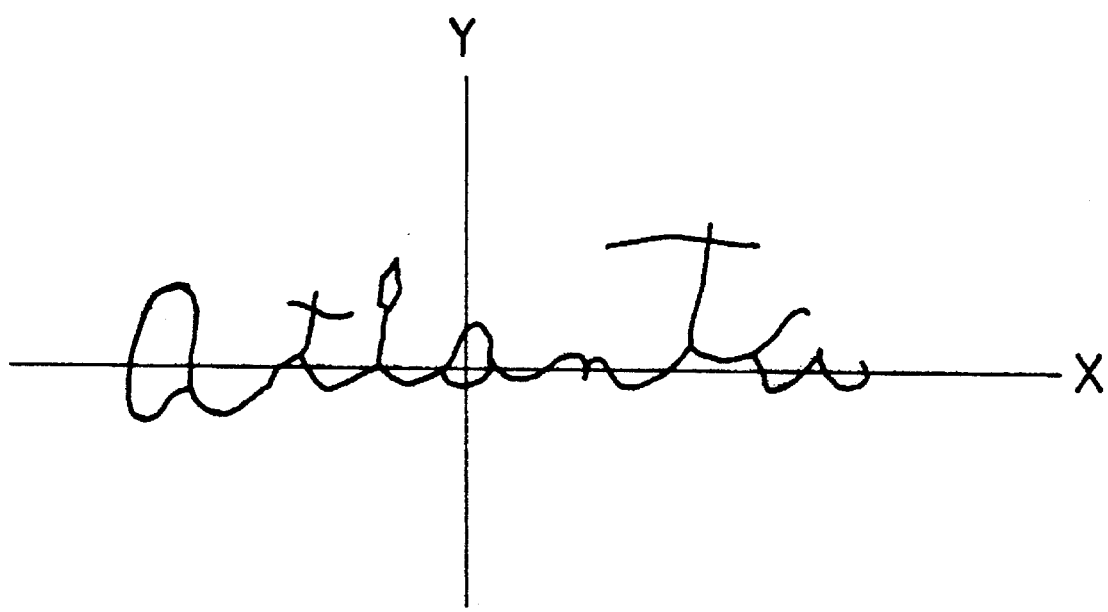
FIG. 18 shows a coordinate system used in the present invention.

The shape information for each primitive consists of three items: length, in pixels; pixel location of original and terminal feature points; and direction. Length is derived by counting the pixels of each primitive. Location is derived by obtaining the x-y plane location of the start and end point as shown in FIG. 18. The direction features are shown graphically in FIG. 6. Three different directions are used to define the shape of a primitive. First is the start-end-direction. This is the direction of a line segment connecting the original and terminal points of the primitive. Second is start-in-direction. This is the direction of a line segment connecting the first two pixels in the primitive. Third is the end-in-direction, which is the direction of a line segment connecting the last two pixels of the primitive. The start-end-direction and the start-in-direction are measured with respect to a reference axis in the X-direction crossing the original point. The end-in-direction is measured with respect to a reference axis in the X-direction crossing the terminal point.

The step of sequencing is the arranging of primitives in order of creation by the writer. Because it can be assumed that writers generally write from left to right and use continuous strokes, the order of creation of each segment can be assigned by sequentially numbering connected primitives from left to right. The sequence and shape information is then stored in memory.

III. Recognition

In the recognition phase, the shapes and sequence of the primitives are then compared with the shape information (length, location of original and terminal feature points and direction) and sequences associated with each word stored in memory. The output of this search function is a ranked list of potential match candidates based on probability of match.

Matching is performed by evaluating edit distances between the list of primitives defining the word to be recognized (subject word) and the list of primitives stored in memory for various words (memory words). The edit distance is the number of operations needed to transform the subject word into a memory word. The three types of operations which may be necessary to transform a subject word into a memory word are: substituting, which is the substitution of one primitive for another; insertion, which is the insertion of a primitive(s) into the subject word in order to produce a match with a memory word; and deletion, which is the deletion of a primitive(s) from the subject word in order to produce a match with a memory word. The lower the edit distance the higher the probability that the subject word and the memory word match. For instance, if a subject word and a memory word are identical, their edit distance is zero (no edit operations needed to transform the subject word to the memory word) and their probability of matching is high.

The method of the present invention segments words into an ordered list of primitives. On-line recognition systems scan a pad as a word is written and store each new primitive, as it is written, in an ordered list of primitives. Recognition of the word written on the pad is performed by comparing the ordered list of primitives with lists representing words in memory. The method of the present invention is compatible with on-line systems, and can be used with recognition software employed in on-line systems. Further, the present method can more accurately recognize words of cursive script than can on-line systems. The accuracy of on-line recognition systems depends in part on the speed at which the word is written. The faster the writing speed, the less accurate the word recognition. Because the present method is able to extract the temporal information used in on-line systems from static text, writing speed is not a factor. Thus, it is unexpected that a static, off-line system can be used in conjunction with an on-line character recognition system to improve its operation.

IV. Summary

It is apparent that the method discussed above describes the computer program listing attached as a microfiche appendix hereto. The method is also shown in block diagram form in FIG. 17, and hardware implementations are shown in FIGS. 19 and 20.

As can be seen from the block diagram, the method can be divided into three distinct phases: preprocessing; extraction of temporal information; and recognition.

First is the preprocessing phase. Preprocessing comprises optically reading the word from a mailpiece 10 (or any other object having a word thereon) with an OCR 2 (or directly from an electronic tablet 12 in an alternative embodiment), storing the word in memory 4, thresholding the word into a binary image and thinning the thresholded image to form an image having a thickness of roughly one pixel.

After preprocessing, temporal information is extracted from the thinned image. This second phase first requires tracing the thinned word. After tracing, the word is segmented into primitives. The primitives are then sequenced to indicate the order in which they were written.

In the recognition phase, the list of ordered primitives is compared with primitives and sequences for words stored in memory. The comparison yields a list of words having a high probability of matching the subject word. All operations following storage of the word are performed in computer 6. Finally, the mailpiece 10 containing the word can be sorted using a known mail sorting device 8 (or in the embodiment shown in FIG. 20, the recognized word fed to an application system 14).

EXAMPLE 1

FIG. 14 shows an example of the word recognition method of the present invention. The original cursive script is shown in FIG. 14(a). FIG. 14(b) shows the thinned image of the original cursive script. Beginning with FIG. 14(c), the procedure for segmenting the word into primitives is shown. FIG. 14(c) depicts the first primitive, which typically is the left-most primitive having an end point. Since no end point is present in the left-most or next-to-left-most primitive in the word "center", the left-most primitive is designated the first primitive. Beginning with the first primitive in FIG. 14(c), successive primitives are identified and separated from the thinned image, as can be seen in FIGS. 14(d) through (n). The terminal point of the first primitive, which is either an end point or a corner point, is the point of origin for the succeeding primitive. This next primitive is defined by its original point and the next feature point with degree ~2. Tracing in this manner continues until a final end point is encountered.

Special cases occur where the stroke of the pen used to create the word retraces a mark as in the n, the t, and the r in the word "center". In tracing primitives associated with these letters, the method of the present invention chooses to follow the branch at an intersection point making the greatest angle with the first branch. See FIGS. 14(g), FIG. 14(j) and FIG. 14(k). After a feature point with degree ~2 is reached, the next primitive is traced by retracing the preceding primitive to the point of intersection and then tracing the branch not traced in the preceding primitive. See FIGS. 14(g) and 14(h); FIGS. 14(j) and 14(k); and FIGS. 14(m) and 14(n). In the event that the preceding primitive did not terminate in an end point, as shown in the second letter "e" in the word "center", the preceding primitive terminates at the corner point, as shown in FIG. 14(k). The succeeding primitive originates at that corner point and terminates at the next feature point having degree ~2. No back tracking is necessary in this instance. Any overlapping region then becomes part of the succeeding primitive, as shown in FIG. 14(m).

Once all primitives have been traced and their associated information stored, their sequence and shapes are compared with those of words stored in memory and a list of words having high probabilities of matching the subject word can be generated.

EXAMPLE 2

FIG. 15 shows a second example. In this example, the subject is the word "Atlanta." As can be seen in FIG. 15(b), the left-most and next-to-left-most primitives do not contain end points. Thus, according to the present method, the left-most primitive is denoted the first primitive. See FIG. 15(c). As can be seen, the same rules as were followed in the previous example are used in the present example. If an intersection point is met, the present method will choose to continue along the branch making the greatest angle with the original branch. See FIG. 15(d). If that branch terminates in an end point, such as in the first "t" in the word Atlanta, the overlapping region will be retraced and hence will be part of two primitives. See FIGS. 15(f) and (g). When a final end point is reached, as in the third "a" of the word Atlanta, the method of the present invention will trace any portions of the word image which were not previously traced. Specifically, the crosses of the two letters "t" in Atlanta will be traced.

When all of the primitives have been identified, the sequence and shape of the primitives are compared with words in memory to generate a list of probable matches.

From the foregoing it can be seen that an improved method for recognizing words of cursive script has been described. While the invention has been described with respect to preferred embodiments, it will be apparent that certain modifications and changes can be made without departing from the spirit and scope of the invention and therefore it is intended that the foregoing disclosure be limited only by the claims appended hereto.

We claim:

1. A method for recognizing a static handwritten word of cursive script, comprising:

optically reading said word and forming a bit map of pixels representing said word;

skeletonizing said word within said bit map;

segmenting said skeletonized word into one or more primitives, said skeletonized word including a plurality of feature points and said primitives each comprising a continuous segment of said skeletonized word extending between an original feature point and a terminal feature point;

forming a sequence representing the order in which said primitives were written by ordering said primitives in succession beginning at the left side of said word; and classifying said word by comparing said primitives and said sequence with stored primitives and their associated sequences for known words, wherein the step of forming a sequence comprises:

locating a primitive which is left-most in said word, examining said left-most primitive for the presence of one or more of said end points and designating said left-most primitive as a first primitive if it contains one or more of said end points;

if said left-most primitive does not contain one or more of said end points, examining a primitive connected with said left-most primitive for the presence of an end point, and designating said connected primitive as said first primitive if it contains an end point and designating said left-most primitive as said first primitive if said connected primitive does not contain an end point; and ordinally designating as subsequent primitives each of said primitives which are connected which are connected with said first primitive and with said subsequent primitives.

2. The method according to claim 1, wherein the step of skeletonizing comprises:

thresholding said bit map, such that said pixels having an intensity above a predetermined level are assigned a binary value of one and all other of said pixels are assigned a binary value of zero, said thresholded bit map thereby containing at least one continuous line consisting of said pixels having a value of zero, said at least one line beginning at an original point and ending at a terminal point; and thinning said at least one continuous line to form a line with a width of approximately one pixel.

3. The method according to claim 1 wherein said step of segmenting said skeletonized word into primitives comprises:

beginning at a first one of said feature points, tracing adjacent pixels until a second one of said feature points is encountered, said first and second feature points and said adjacent pixels thereby constituting a primitive; and storing the location of said first and second feature points and the number and direction of pixels between said first and second feature points.

4. The method according to claim 3, wherein said adjacent pixels are pixels having an assigned value of 1.

5. The method according to claim 3 wherein said first one of said points is either a corner point or an end point and said second one of said points is either a corner point or an end point.

6. The method according to claim 3 further comprising:

if said second point was not a terminal point, repeating the preceding step until one of said primitives contains a feature point which is said terminal end point.

7. The method according to claim 1 wherein said classifying comprises:

determining the length and direction of each of said primitives; and comparing said length, direction and sequence of said primitives for said word with primitives of words stored in a memory device and generating a list of words having a high probability of matching said word.

8. The method according to claim 7 wherein said step of determining the length and direction comprises:

counting the number of said pixels constituting said primitive, said primitive having an original feature point and a terminal feature point; and measuring:

the angle formed with horizontal by an imaginary straight line between said original and terminal feature points, the angle formed with horizontal by an imaginary straight line between said original feature point and a pixel adjacent said original feature point; and the angle formed with horizontal by an imaginary straight line between said terminal feature point and a pixel adjacent said terminal feature point.

9. The method according to claim 1 wherein the feature points comprise end feature points, corner feature points, and intersection feature points.

10. The method according to claim 9 wherein the original feature point and the terminal feature point may be either an end feature point or a corner feature point.

11. The method according to claim 9 wherein said intersection feature points are disposed between original feature points and terminal feature points.

12. The method according to claim 9 wherein the word is initially traced between the original feature point and the terminal feature point of each primitive.

13. The method according to claim 12 wherein each primitive having one of the intersection feature points is traced in a first manner.

14. The method according to claim 13 wherein each primitive having another one of the intersection feature points is traced in a second manner.

15. The method according to claim 1 wherein the handwritten word of cursive script comprises two or more connected characters and one or more of said primitives extends between two of the characters.

16. Apparatus for recognizing a static handwritten word of cursive script, comprising;

means for reading said word and forming a bit map of pixels representing said word;

means for skeletonizing said word within said bit map;

means for segmenting said skeletonized word into one or more primitives, said skeletonized word including a plurality of feature points and said primitives each comprising a continuous segment of said skeletonized word extending between an original feature point and a terminal feature point;

means for forming a sequence representing the order in which said primitives were written by ordering said primitives in succession beginning at the left side of said word; and means for classifying said word by comparing said primitives and said sequence with each of a plurality of stored primitives and their associated sequences for known words, wherein said means for forming a sequence comprises:

means for locating a primitive which is left-most in said word, examining said left-most primitive for the presence of one or more of said end points and designating said left-most primitive as a first primitive if it contains one or more of said end points;

means for examining a primitive connected with said left-most primitive for the presence of an end point if said left-most primitive does not contain one or more of said end points, and for designating said connected primitive as said first primitive if it contains an end point and designating said left-most primitive as said first primitive if said connected primitive does not contain an end point; and means for ordinally designating as subsequent primitives each of said primitives which are connected with said first primitive and with said subsequent primitive.

17. The apparatus according to claim 16, comprising:

means for thresholding said bit map, such that said pixels having an intensity above a predetermined level are assigned a binary value of one and all other of said pixels are assigned a binary value of zero, said thresholded bit map thereby containing at least one continuous line consisting of said pixels having a value of zero, said at least one line beginning at an original point and ending at a terminal point; and means for thinning said at least one continuous line to form a line with a width of approximately one pixel.

18. The apparatus according to claim 16, wherein said means for segmenting said skeletonized word comprises:

means for tracing adjacent pixels, beginning at a first one of said points, until a second one of said points is encountered, said first and second points and said adjacent pixels thereby constituting a primitive; and means for storing the location of said first and second points and the number and direction of pixels between said first and second points.

19. The apparatus according to claim 16 wherein said classifying comprises:

means for determining the length and direction of each of said primitives; and means for comparing said length, direction and sequence of said primitives for said word with primitives of words stored in a memory device and for generating a list of words having a high probability of matching said word.

20. The apparatus according to claim 19 wherein said means for determining the length and direction comprises:

means for counting the number of said pixels constituting said primitive said primitive having an original feature point and a terminal feature point; and means for measuring:
the angle formed with horizontal by an imaginary straight line between original and terminal feature points,
the angle formed with horizontal by an imaginary straight line between said original feature point and a pixel adjacent said original feature point; and
the angle formed with horizontal by an imaginary straight line between said terminal feature point and a pixel adjacent said terminal feature point.

21. The apparatus according to claim 16 wherein said means for reading comprises means for reading a static image.

22. The apparatus according to claim 21 wherein said static image reading means is an optical character reading device.

23. The apparatus according to claim 16 wherein said means for reading comprises means for reading characters dynamically.

24. The apparatus according to claim 16 wherein the feature points comprise end feature points, corner feature points, and intersection feature points.

25. The apparatus according to claim 24 wherein the original feature point and the terminal feature point may be either an end feature point or a corner feature point.

26. The apparatus according to claim 24 wherein said intersection feature points are disposed between original feature points and terminal feature points.

27. The apparatus according to claim 24 wherein the word is initially traced between the original feature point and the terminal feature point of each primitive.

28. The apparatus according to claim 27 wherein each primitive having one of the intersection feature points is traced in a first manner.

29. The apparatus according to claim 28 wherein each primitive having another one of the intersection feature points is traced in a second manner.

30. The apparatus according to claim 16 wherein the handwritten word of cursive script comprises two or more connected characters and one or more of said primitives extends between two of the characters.

31. A system for reading and sorting mail, comprising:

means for optically reading an address from a mail piece, said address comprising at least one static word;

means for forming a bit map of pixels representing said word;

means for skeletonizing said word within said bit map;

means for segmenting said skeletonized word into one or more primitives, said skeletonized word including a plurality of feature points and said primitives each comprising a continuous segment of said skeletonized word extending between an original feature point and a terminal feature point and wherein said word comprises two or more connected characters and one or more of said primitives extends between two of the characters;

means for forming a sequence representing the order in which said primitives were written by ordering said primitives in succession beginning at the left side of said word;

means for classifying said word by comparing said primitives and said sequence with each of a plurality of stored primitives and their associated sequences for known words; and means for directing said mail piece in response to the result of the classification of said word, wherein said means for forming a sequence comprises:

means for locating a primitive which is the left-most in said word, examining said left-most primitive for the presence of one or more of said end points and designating said left-most primitive as a first primitive if it contains one or more of said end points means for examining a primitive connected with said left-most primitive for the presence of an end point if said left-most primitive does not contain one or more of said end points, and for designating said connected primitive as said first primitive if it contains an end point and designating said left-most primitive as said first primitive if said connected primitive does not contain an end point; and means for ordinally designating as subsequent primitives each of said primitives which are connected with said first primitive and with said subsequent primitives.

* * * * *